United States Patent
Evans

(10) Patent No.: US 11,017,448 B2
(45) Date of Patent: *May 25, 2021

(54) ON-DEMAND CUSTOMIZATION OF PRODUCTS

(71) Applicant: Amazon Technologies, Inc., Seattle, WA (US)

(72) Inventor: Ethan Zane Evans, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 237 days.

This patent is subject to a terminal disclaimer.

(21) Appl. No.: 16/125,388

(22) Filed: Sep. 7, 2018

(65) Prior Publication Data

US 2019/0005560 A1 Jan. 3, 2019

Related U.S. Application Data

(63) Continuation of application No. 14/667,002, filed on Mar. 24, 2015, now Pat. No. 10,074,124.

(51) Int. Cl.
*G06Q 30/06* (2012.01)

(52) U.S. Cl.
CPC .............. *G06Q 30/0621* (2013.01)

(58) Field of Classification Search
None
See application file for complete search history.

(56) References Cited

U.S. PATENT DOCUMENTS

| 6,853,978 B2* | 2/2005 | Forth ............... G06Q 10/087 370/468 |
| 6,915,275 B2* | 7/2005 | Banerjee ............ G06Q 30/06 705/26.5 |
| 7,983,777 B2* | 7/2011 | Melton ............. A61F 2/30942 700/98 |

(Continued)

FOREIGN PATENT DOCUMENTS

WO   WO-2004097695 A1 * 11/2004   ............. G06Q 30/02

OTHER PUBLICATIONS

Anon., "Hardware.com Puts Time on Every Home Improvement Enthusiasts Side With Addition of XpertSite's AskMe Network," Business Wire, Feb. 29, 2000. (Year: 2000).*

(Continued)

*Primary Examiner* — Nicholas D Rosen
(74) *Attorney, Agent, or Firm* — Robert C. Kowert; Kowert, Hood, Munyon, Rankin & Goetzel, P.C.

(57) ABSTRACT

Methods and apparatus for on-demand customization of products. A product distributor may provide a product customization service and user interface to its customers that may be used to enhance, extend, customize, or combine stock physical products offered by the product distributor by providing custom add-on physical items for or customizations to the stock products. The product distributor may leverage on-demand production technologies such as additive manufacturing technologies to produce the custom physical items or customizations according to specifications received from the customer or generated according to descriptive information for the stock products. The custom items may be combined with one or more stock products to produce customized products for the customers.

20 Claims, 12 Drawing Sheets

(56) References Cited

U.S. PATENT DOCUMENTS

| | | | |
|---|---|---|---|
| 8,266,546 B2* | 9/2012 | Candrian | G06Q 30/0621 715/815 |
| 8,407,065 B2* | 3/2013 | DeGheest | A61F 13/00987 705/2 |
| 8,412,588 B1 | 4/2013 | Bodell et al. | |
| 8,645,230 B2 | 2/2014 | Oliver et al. | |
| 9,159,106 B1* | 10/2015 | Bodell | G06Q 30/0601 |
| 9,597,584 B1* | 3/2017 | George | A63F 13/00 |
| 9,672,550 B2 | 6/2017 | Apsley et al. | |
| 9,684,919 B2 | 6/2017 | Apsley et al. | |
| 9,858,604 B2 | 1/2018 | Apsley et al. | |
| 9,898,776 B2 | 2/2018 | Apsley et al. | |
| 10,074,124 B1 | 9/2018 | Evans | |
| 2002/0103714 A1* | 8/2002 | Eze | G06Q 30/0621 705/26.5 |
| 2002/0120521 A1* | 8/2002 | Forth | G06Q 30/0635 705/26.5 |
| 2002/0188518 A1* | 12/2002 | Banerjee | G06Q 30/0625 705/26.5 |
| 2003/0109949 A1* | 6/2003 | Ikeda | G06Q 30/02 700/98 |
| 2005/0234783 A1* | 10/2005 | Marshall | G06Q 30/0641 705/27.1 |
| 2007/0203605 A1* | 8/2007 | Melton | G06Q 50/22 700/117 |
| 2008/0126981 A1* | 5/2008 | Candrian | G06Q 30/0621 715/810 |
| 2009/0204423 A1* | 8/2009 | DeGheest | A61F 15/001 705/2 |
| 2011/0213482 A1 | 9/2011 | Saarela et al. | |
| 2011/0282476 A1* | 11/2011 | Hegemier | G06Q 30/0621 700/100 |
| 2012/0059734 A1 | 3/2012 | Chism | |
| 2012/0251688 A1 | 10/2012 | Zimmerman et al. | |
| 2013/0193621 A1 | 8/2013 | Daya et al. | |
| 2014/0067587 A1* | 3/2014 | DiLorenzo | G06Q 30/0621 705/26.5 |
| 2014/0129394 A1 | 5/2014 | Oliver et al. | |
| 2014/0189964 A1 | 7/2014 | Wen | |
| 2014/0290707 A1 | 10/2014 | O'Donnell | |
| 2014/0379110 A1 | 12/2014 | Marks | |
| 2015/0052024 A1 | 2/2015 | Apsley et al. | |
| 2015/0081076 A1 | 3/2015 | Fernandes | |
| 2015/0262402 A1 | 9/2015 | Heinz, II et al. | |

OTHER PUBLICATIONS

Beatton, P., "Heed the good oil on protecting fence posts efficiently," The Courier-Mail [Brisbane, Queensland], Oct. 15, 2004, p. 52. (Year: 2004).*
U.S. Appl. No. 14/318,002, Gerard Joseph Heinz II, et al. (Year: 2014).*
U.S. Appl. No. 13/799,877, filed Mar. 13, 2013, Colin Bodell, et al.
U.S. Appl. No. 14/317,961, filed Jun. 27, 2014, Michael Martin George, et al.
U.S. Appl. No. 14/318,302, filed Jun. 27, 2014, Michael Schleif Pesce, et al.
U.S. Appl. No. 14/318,273, filed Jun. 27, 2014, Michael Schleif Pesce, et al.

* cited by examiner

ON-DEMAND CUSTOMIZATION OF PRODUCTS

This application is a continuation of U.S. patent application Ser. No. 14/667,002, filed Mar. 24, 2015, now U.S. Pat. No. 10,074,124, which is hereby incorporated by reference herein in its entirety.

BACKGROUND

The evolution and availability of technology has led to the continuing growth of online sales. Product producers or vendors may make any number of physical products available to customers (also referred to as users or clients) over intermediate networks such as the Internet via web sites, web applications, mobile applications and so on. Physical products may be offered online via websites or applications of the product producers, or may be offered via websites or applications of product distributors such as retailers, resellers, or online merchants that offer products from many different product producers to their customers. Customers may access information regarding the available products through a website or other information service provided by the product distributor. The information regarding the products may generally include that information needed by the customer to identify and purchase a particular product via the product distributor, such as the name and description of the product, the price and availability of the product, and the like.

In a product distribution system, a product distributor typically maintains an inventory of various products at one or more distribution centers, fulfillment centers, cross-docking facilities, materials handling facilities or warehouses (which may collectively be referred to as materials handling facilities). The inventory products are ordered from one or more vendors, received at the materials handling facilities as inbound shipments, and stocked in inventory of the materials handling facilities. In a conventional order fulfillment process, orders for products may be received from customers of the product distributor. Units of the ordered products are picked from various locations in the inventory in the materials handling facilities, processed for shipping, and shipped as outbound shipments to the customers.

Figure 1:
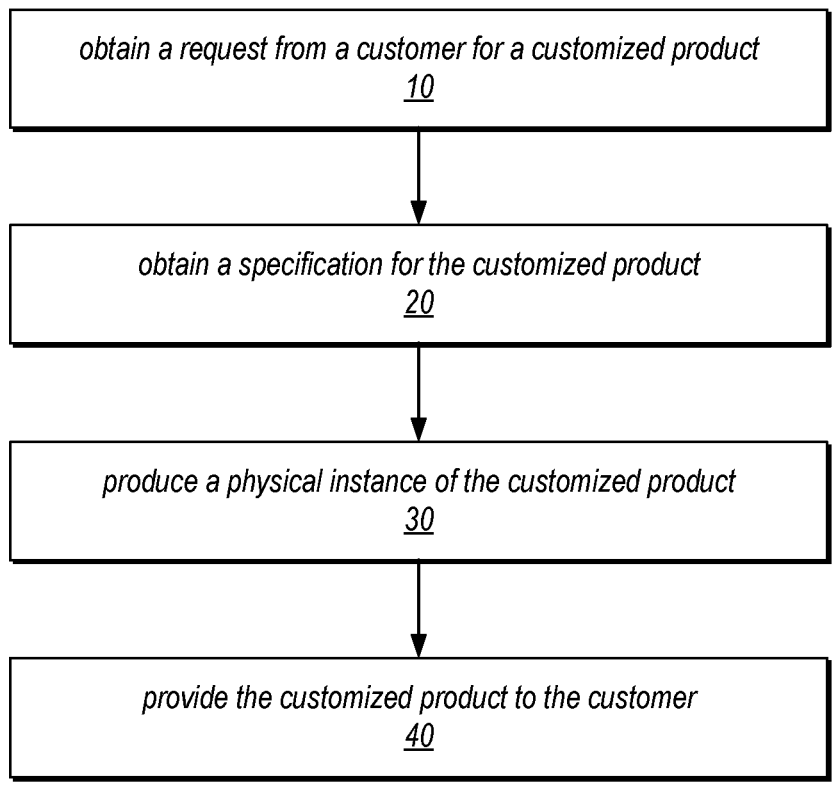
FIG. 1 is a high-level flowchart of a method for on-demand customization of products, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for the on-demand customization of products are described. In embodiments, a product distributor such as a retailer, reseller, or online merchant may provide a product customization service to its customers that may be used to enhance, extend, customize, or combine stock physical products or items offered via the product distributor to generate customized products on demand. The stock physical products may, for example, include products that are mass-produced by one or more product providers, stored in an inventory of the product distributor, and offered for sale to customers or clients by the product distributor.

In embodiments, a product distributor may implement or have access to one or more on-demand production technologies including but not limited to additive manufacturing technologies such as 3D printing technologies, parts fabrication technologies such as water jet cutter technologies, and so on that may be leveraged to produce customizations for or to the stock items on demand in response to customer requests. In at least some embodiments, the on-demand production technologies may include automated processes that are configured to produce or fabricate a new physical item and/or modify an existing physical item according to a customization specification such as a 3D model (e.g., a computer-aided design (CAD) model, computer-generated imagery (CGI) model, etc.) or other digital representation that is input to an on-demand production process. However, the on-demand production technologies may also include semi-automated and/or manual processes.

In some embodiments, the product customization service may leverage the on-demand production technologies to provide custom add-on physical items for stock physical products or items selected by customers. In some embodiments, the product customization service may provide custom add-on physical items for or customizations to selected stock items according to customers' specifications. In some embodiments, the product customization service may generate a requested custom product for a customer by determining components for the customized product from stock item information and combining the components to generate a customized product according to the customer's request. The components of a customized product may include one or more stock physical products, one or more parts of stock products, and/or one or more custom-produced physical items.

In some embodiments, instead of generating a requested custom product for a customer, the product customization service may generate a specification for a requested custom product and provide the specification to the customer. The customer may then produce the custom product according to the provided specification, for example using 3D printing technology owned by the customer or provided by a third party.

FIG. 1 is a high-level flowchart of a method for on-demand customization of products, according to at least some embodiments. As indicated at 10 of FIG. 1, a request for a customized product may be obtained from a customer. For example, the product distributor may provide a user interface (UI) and/or application programming interface (API) to a product customization service via which customers (also referred to as users or clients) may specify or select customizations such as containers, add-ons, or modifications for specified or selected stock items. As indicated at 20 of FIG. 1, the product distributor may obtain a specification for the customized product. For example, a specification for a customization, such as a digital 3D model or other digital representation, may be received from the customer or from some other source, may be generated based on information describing the specified stock item(s), or may be otherwise obtained. The specification may include, but is not limited to, indications of sizes, colors, materials, and other physical and visual aspects of the customized product and/or parts of components of the customized product. As indicated at 30 of FIG. 1, the product distributor may produce a physical instance of the customized product based on the specification. For example, the customized product specification may be provided to an on-demand production facility, which may generate a custom item or modification to an item based on the specification. The custom item may then be combined with one or more stock items to form a customized product, which may then be provided to the respective customer as indicated at 40 of FIG. 1. In some embodiments, instead of producing the physical instance of the customized product, the product distributor may provide a specification to the customer instructing the customer as to how to produce a physical instance of the customized product.

The stock physical products, also referred to herein as stock items, may, for example, include any physical product, item or object that is produced by a product producer or vendor and offered to customers via the product distributor. As non-limiting examples, the stock items may include vehicles and vehicle accessories, consumer electronic devices, entertainment devices, toys, sports equipment, recreational equipment, appliances, tools, utensils, apparel, furniture, books, or in general any real-world, physical product or item that may be enhanced, extended, customized, or combined with other products or items according to the on-demand product customization methods and apparatus as described herein.

The stock items may include branded, trademarked, or otherwise protected products of various vendors. In some embodiments, an entity such as a product distributor that provides on-demand customization of stock items to customers may obtain appropriate permissions from a vendor, or make an agreement with a vendor, to allow the entity to produce and provide the customized products to customers on demand as described herein. In some embodiments, custom items or customized products produced using the methods described herein may be packaged, branded, tagged, or otherwise marked by the product distributor to indicate properly indicate copyrights, brands, or trademarks of the vendors of the stock items for which the customizations are generated.

In some embodiments, for at least some stock items, actual purchase or ownership of the stock item(s) may be required to obtain custom items for or customizations to the stock items. In these embodiments, a customer may purchase a stock item or items, or provide evidence of purchase or ownership of a stock item or items, to the product distributor in order to obtain a custom item or items produced for the stock item(s).

Figure 2:
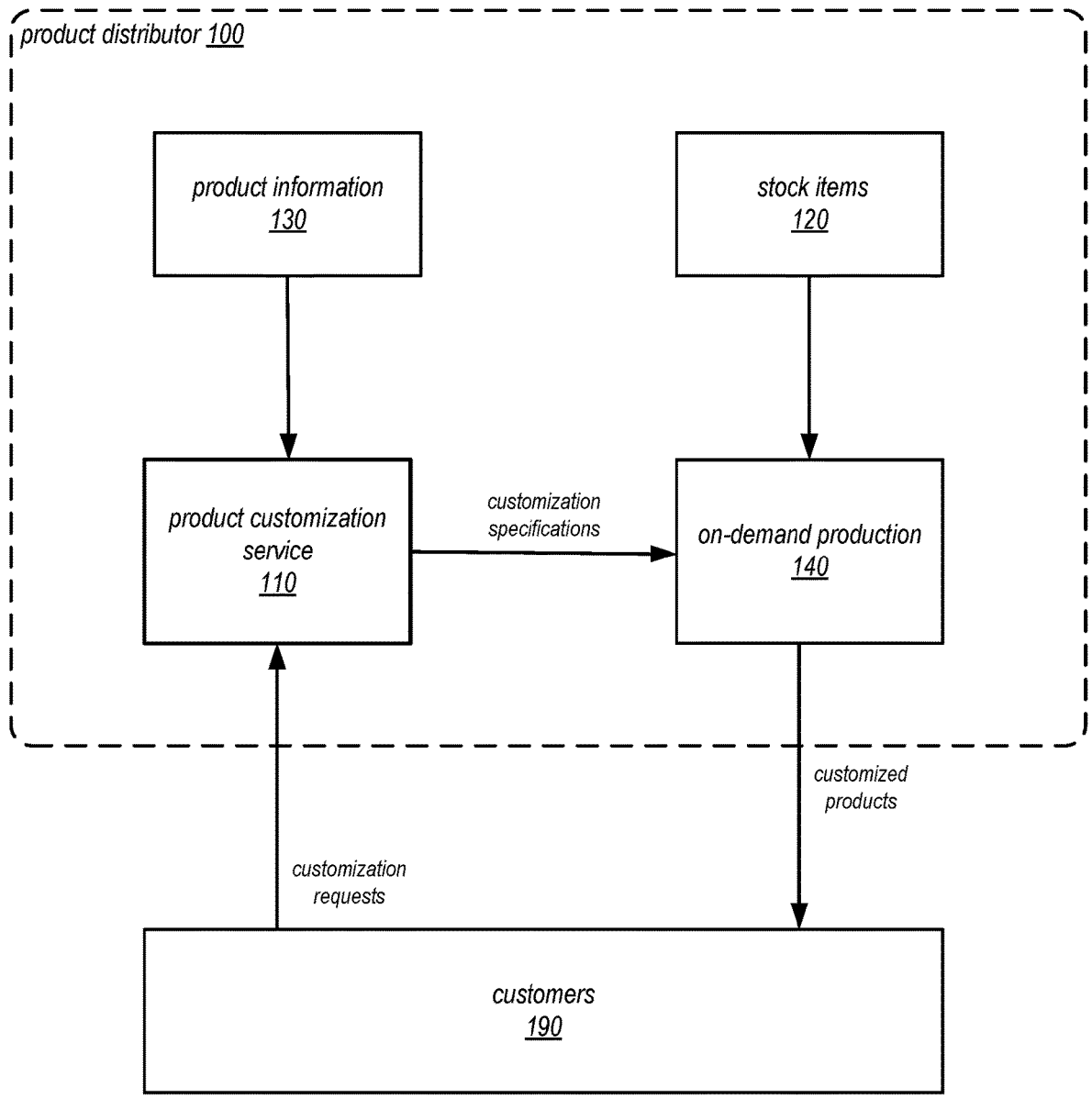
FIG. 2 is a high-level block diagram of a product distributor system that may implement a method for on-demand customization of products as illustrated in FIG. 1, according to at least some embodiments.

In some embodiments, the product distributor may offer the various customizations to stock products as described herein for a fee. However, in some embodiments, at least some of the customizations may be provided at no charge, or may be provided as incentives or promotions or for other marketing purposes FIG. 2 is a high-level block diagram of a product distributor system that may implement a method for on-demand customization of products as illustrated in FIG. 1, according to at least some embodiments. As shown in FIG. 2, a product distributor may provide a product customization service 110 that may receive customization requests from customers 190 and generate specifications for customized products at least in part according to product information 130. The customization specifications may, for example, include descriptive information, dimensions, 3D models (e.g., computer-aided design (CAD) models, computer-generated imagery (CGI) models, etc.), or other digital representations for a respective customized product. The customization specifications may also include, but are not limited to, indications of sizes, colors, materials, and other physical and visual aspects of the customized product and/or parts of components of the customized product. The product distributor 100 may also implement or have access to one or more on-demand production 140 technologies including but not limited to additive manufacturing technologies such as 3D printing technologies, parts fabrication technologies such as water jet cutter technologies, and so on that may be used to produce customizations for or to stock items 120 on demand in response to the customer requests and according to the customization specifications. In at least some embodiments, the on-demand production 140 technologies may include automated processes that are configured to produce or fabricate a new physical item and/or modify an existing physical item according to a customization specification input to the on-demand production 140 process. However, the on-demand production 140 technologies may also include semi-automated and/or manual processes. The on-demand production 140 facilities may output the customized products to the requesting customers 190.

The elements of FIGS. 1 and 2 are explained in more detail with reference to FIGS. 3 through 11.

Figure 3:
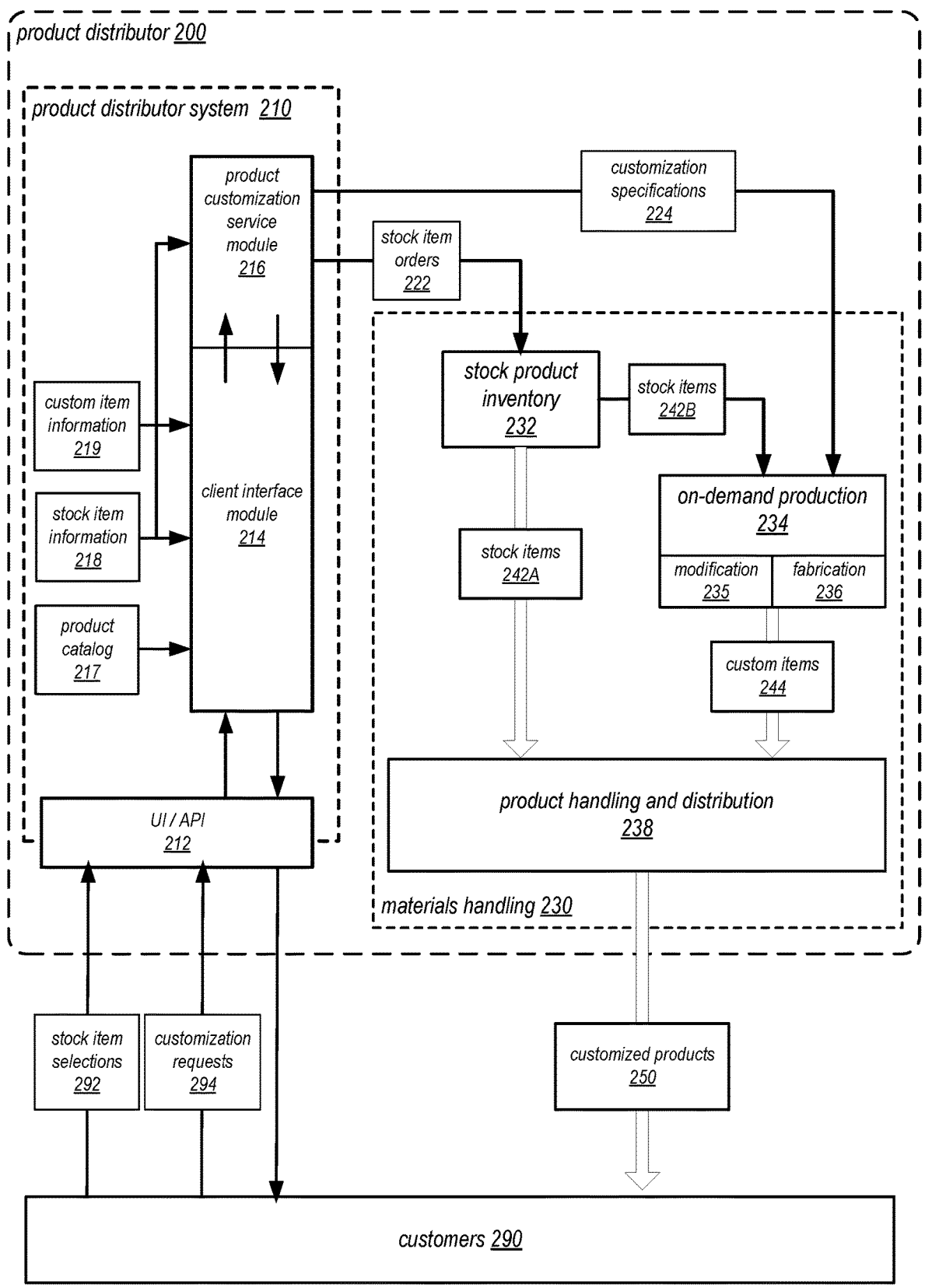
FIG. 3 graphically illustrates an example product distributor environment that produces and delivers customized products to customers in response to customer requests, according to at least some embodiments.

FIG. 3 graphically illustrates an example product distributor 200 environment and system that may produce and deliver customized products 250 to customers 290 in response to customer requests, according to at least some embodiments. A product distributor 200 may implement a product distributor system 210 and materials handling 220 that may include one or more materials handling 220 facilities.

Figure 10A:
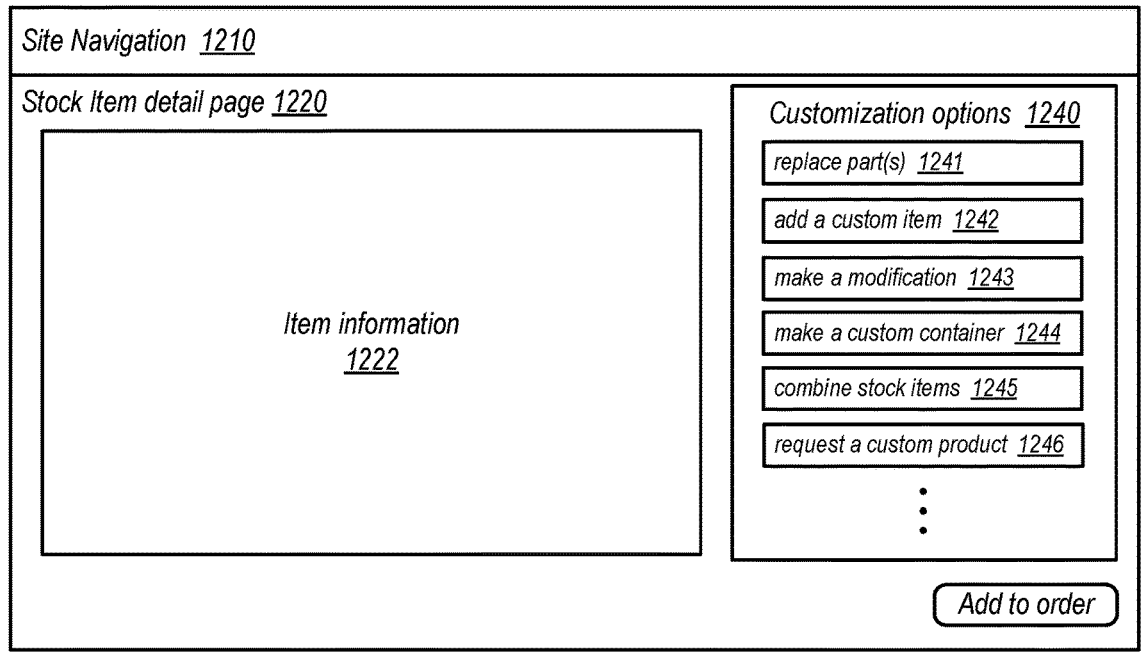
FIGS. 10A and 10B graphically illustrate example interfaces for on-demand customization of products, according to at least some embodiments.
Figure 10B:
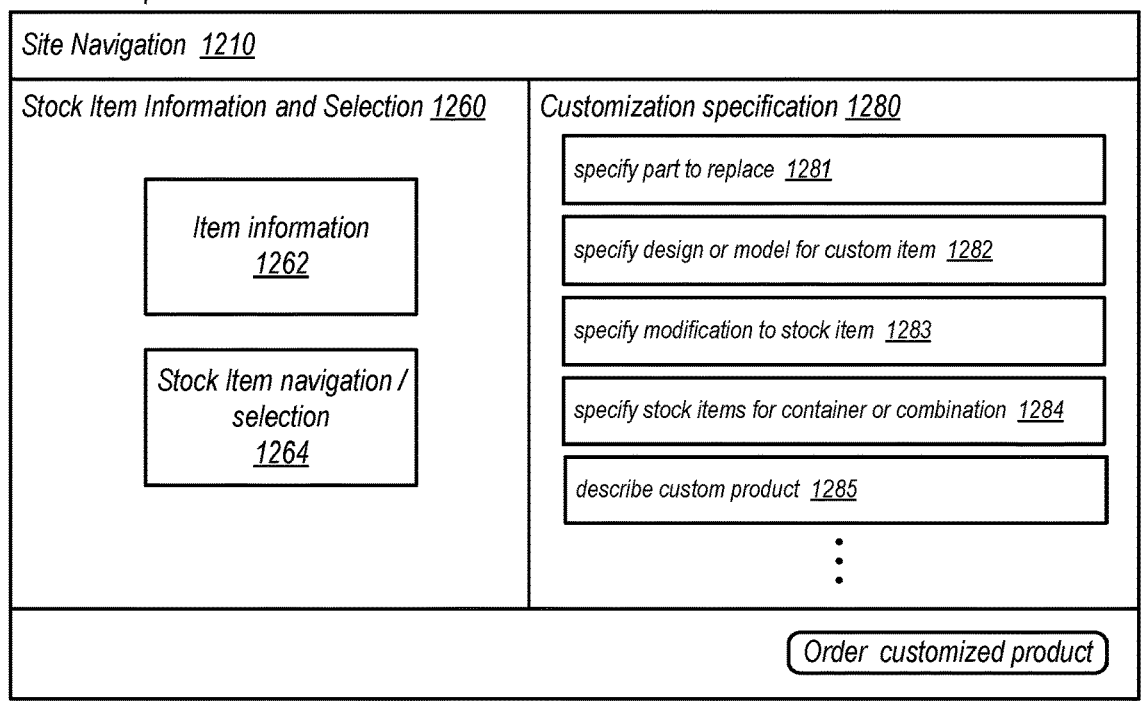

The product distributor system 210 may include networks, servers, storage devices, storage systems, and so on that are configured to provide product services to the customers 290, for example via an intermediate network such as the Internet. The product distributor system 210 may implement product distributor logic that may offer products to customers 290 over a network such as the Internet, and may include one or more modules that may implement functionality for providing on-demand customization of products as described herein. For example, the product distributor system 210 may provide a user interface (UI) and/or application programming interface (API) 212 to product distributor services including but not limited to a client interface module 214 via which customers 290 may browse a product catalog 217 of stock items 242 offered by the product distributor 200 to search for, view, and specify or select stock items 242, and a product customization service module 216 via which customers 290 may enhance, extend, customize, or combine stock items 242 by specifying or selecting customizations such as custom containers, custom add-ons, or custom modifications for specified or selected stock items 242. FIGS. 10A and 10B illustrate non-limiting examples of UI 212 pages that may be used in embodiments.

In a product distribution system, a product distributor 200 may maintain an inventory 232 of various stock products or items at one or more materials handling 230 facilities. In an order fulfillment process, orders for stock products or items may be received from customers 290 of the product distributor 200 via the product distributor system 210. Units of the ordered stock items 242 are picked from various locations in the inventory 232 in the materials handling 230 facility(s), processed for shipping by one or more product handling and distribution 238 processes, and shipped as outbound shipments to the customers 290.

In embodiments, a product distributor 200 may implement or have access to one or more on-demand production 234 facilities that may be used to produce on-demand customizations to stock items 242. The on-demand production 234 facilities may include modification 235 facilities implementing technologies or processes for modifying stock items 242B or parts of stock items 242B and/or fabrication 236 facilities implementing technologies or processes for fabricating new, custom physical items 244 to be combined with one or more stock items 242A in a downstream process or custom items to be combined with or added to one or more stock items 242B in a modification 235 process to generate a custom item 244. Modification 235 facilities may, for example, include technologies or processes for disassembling/reassembling, cutting, drilling, machining, painting, combining, extending, replacing part(s) of, or otherwise modifying stock items 242B and/or parts of stock items 242B. Fabricating 236 technologies may include one or more of, but are not limited to, additive manufacturing technologies such as 3D printing technologies, parts fabrication technologies such as water jet cutter technologies, and so on. The on-demand production 234 facilities may be, but are not necessarily, located within, adjacent to, or near to the materials handling 230 facility(s) that include inventory 232 and product handling and distribution 238. In at least some embodiments, the on-demand production 234 facilities may include automated modification processes 235 and/or fabrication processes 236 that are configured to produce or fabricate a new physical item or modify an existing physical item according to a specification or digital representation such as a 3D model (e.g., a computer-aided design (CAD) model, computer-generated imagery (CGI) model, etc.) or other digital representation that is input to the process. However, the on-demand production 234 facilities may also include semi-automated and/or manual processes.

In some embodiments, a customer 290 may browse the product catalog 217 via UI 212 and client interface module 214 to view and select 292 one or more stock items 244 offered by the product distributor 200, for example via one or more product detail pages presented via the UI 212. The customer may generate a customization request 294 for the selected stock item(s) 244, for example via the product detail page(s) and/or via one or more product customization pages presented via the UI 212. The customization request 294 may specify a customization for or addition to the selected stock item(s) 244, and may be provided to the product customization service module 216. FIGS. 10A and 10B illustrate non-limiting examples of UI 212 pages that may be used in embodiments.

In some embodiments, the customization request 294 may include or specify a digital representation (e.g., a 3D model, CGI model, or other digital representation) of a custom physical item 244 to be produced for and added to or combined with the selected stock item(s) 242A to generate a customized product 250. In some embodiments, the customer 290 may provide the digital representation (e.g., a 3D model) of the custom physical item 244 in the customization request 294, or via other UI 212 methods. In some embodiments, if a digital representation of the custom physical item 244 is not provided by the customer 244, the product customization service module 216 may generate or obtain a digital representation (e.g., a 3D model) of the custom physical item 244 indicated by the customization request 294. For example, in some embodiments, a digital representation of a custom item 244 may be generated at least in part from stock item information 218 describing the stock item(s) 242A for which the custom item 244 is to be produced. For example the stock item information 218 may include digital representations of at least some of the stock physical items 242 carried by the product distributor 200 that may be used in generating digital representations for custom items 244. In some embodiments, the product distributor system 210 may store custom item information 219 which may include digital representations of or templates for custom items 244, and a digital representation of a custom item 244 may be obtained from or generated at least in part according to the custom item information 219.

In some embodiments, instead of or in addition to specifying a custom item 244 to be produced for a stock item 242A, the customization request 294 may include or specify a modification to a stock item 242B to generate a custom item 244. For example, the customization request 294 may specify that a stock item 242B is to be modified, or that a part of a stock item 242B is to be modified or replaced, to generate a custom item 244 according to the customer 290's request. For example, the customization request 294 may specify custom dimensions for a stock item 242B or stock item 242B part that may require modifications to resize the stock item 242B or stock item 242B part, or replacement of a stock item 242B part with a smaller or larger part, to achieve the custom dimensions as requested. In some embodiments, the customization request 294 may include or specify a digital representation of the stock item 242 as modified. Modifications that may be specified for a stock item 242B may include one or more of, but are not limited to, cutting, drilling, machining, painting, combining, extending, resizing, replacing part(s) of, or otherwise modifying the stock item 242B or stock item 242B part.

In some embodiments, the product customization service module 216 may generate a customization specification 224 according to the customization request 294, and provide the customization specification 224 to an on-demand production 234 facility or process of the materials handling 230 facility. In some embodiments, one or more stock item orders 222 may also be generated and provided to a stock product inventory 232 facility or process of the materials handling 230 facility.

If a customization specification 224 indicates modification(s) to stock item(s) 242B, then respective stock item(s) 242B may be picked from inventory 232 according to stock item order(s) 222 and delivered to a modification facility of on-demand production 234 for modification according to the specification 224 using one or more appropriate modification 235 technologies or processes to generate a custom item 244. Modifications that may be performed on a stock item 242B may include one or more of, but are not limited to, disassembling, cutting, drilling, machining, painting, combining, extending, resizing, replacing part(s) of, or otherwise modifying the stock item 242B or stock item 242B part. The modifications may be performed by automated, semi-automated, and/or manual processes according to the specification 224. The custom item 244 may be delivered to product handling and distribution 238 facilities or processes of materials handling 230 for processing and delivery to the requesting client 290 as a customized product 250. In some embodiments, custom packaging and/or labeling may be generated for the customized product 250.

If a customization specification 224 indicates a new custom physical item 244 to be generated and combined with stock item(s) 242A, then the specification 224 may be input to a fabrication 236 process or technology (e.g., an additive manufacturing technology such as 3D printing technology) of on-demand production 234 to fabricate or otherwise produce an instance of the custom physical item 244 according to a digital representation of the custom item 244 included in the specification 224. The custom item 244 may be delivered to product handling and distribution 238 facilities or processes of materials handling 230 to be combined with the respective stock item(s) 242A picked from inventory 232 according to an order 222 to generate a customized product 250 for delivery to the requesting client 290. In some embodiments, custom packaging and/or labeling may be generated for the customized product 250.

In some embodiments, instead of or in addition to allowing a customer 290 to select one or more stock items 242 and specify a customization for the stock items 242 as described above, the product distributor system 210 may allow a customer 290 to select a customization via the UI 212 to generate a customization request 294, and then select 292 one or more stock items 242 for which the customization is to be provided or to which the customization is to be applied. The product customization service module 216 may then facilitate fabrication of a custom item 244 or items and/or modification of one or more stock items 242B and combination of the item(s) to generate a customized product 250.

In some embodiments, instead of or in addition to generating customized products 250 based on customers' customization requests 294, the product distributor system 210 may automatically generate customization specifications 224 for one or more custom items 244 for at least some stock item(s) 242A ordered by customers 290 via the UI 212 without requiring the customers 290 to request 294 the customizations. The custom items 244 may then be fabricated 236 and combined with the stock items 242A to form customized products 250 for delivery to respective ones of the customers 290. In some embodiments, custom packaging and/or labeling may be generated for the customized product 250.

FIGS. 4 through 9 illustrate example methods for generating customized products using on-demand production technologies that may be implemented by a product distributor, for example in a product distributor environment as illustrated in FIGS. 2 and 3, according to various embodiments.

Figure 4:
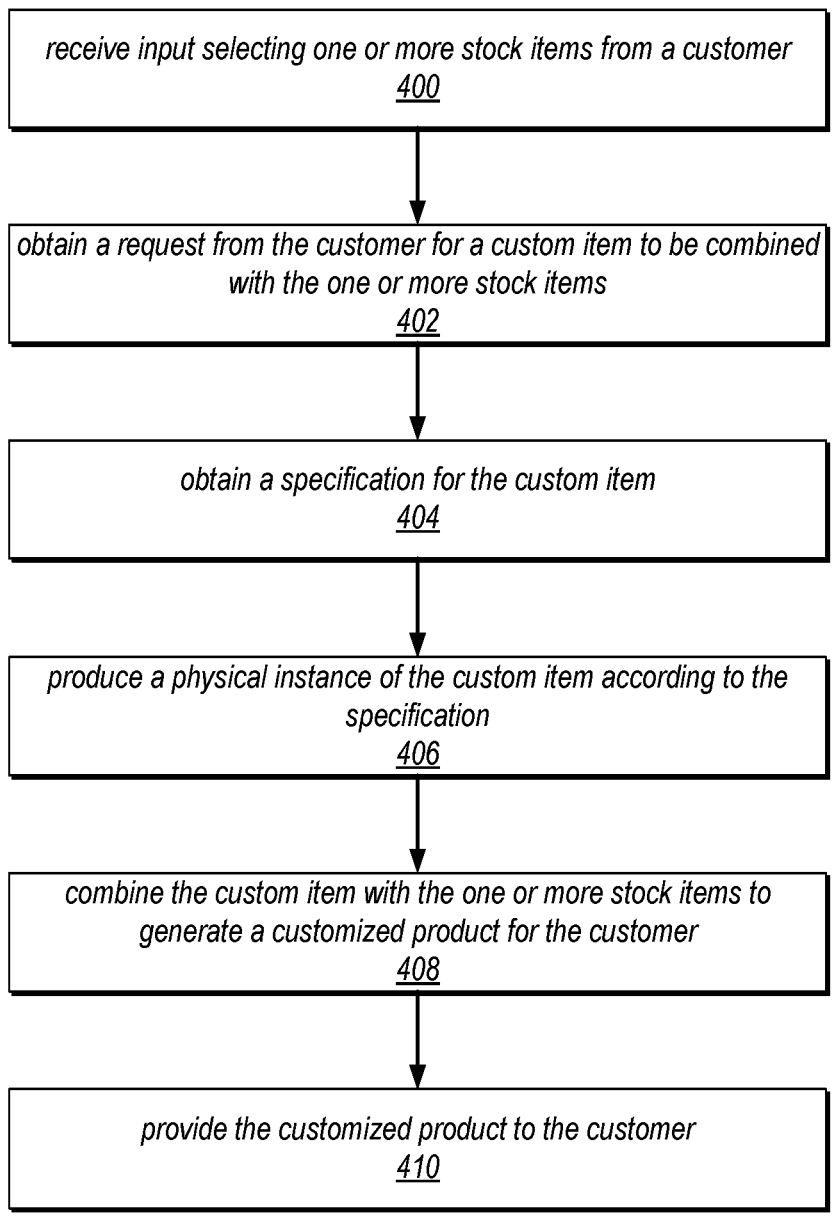
FIG. 4 is a flowchart of a method for producing a custom item as specified by a customer and combining the custom item with one or more stock items to generate a customized product, according to at least some embodiments.

FIG. 4 is a flowchart of a method for producing a custom item as specified by a customer and combining the custom item with one or more stock items to generate a customized product, according to at least some embodiments. The method of FIG. 4 may, for example, be performed at least in part by a product customization service in a product distributor environment as illustrated in FIGS. 2 and 3.

As indicated at 400 of FIG. 4, a product distributor may receive input selecting one or more stock items from a customer. For example, the input may be received via a user interface (UI) to product distributor services via which customers may browse a product catalog of stock items offered by the product distributor to search for, view, and specify or select stock items. The stock items may, for example, be physical products that are mass-produced by one or more product providers, stored in an inventory of the product distributor, and offered for sale to customers or clients by the product distributor. In some embodiments, the customer may, but does not necessarily, purchase the selected stock item(s) from the product distributor via the UI.

As indicated at 402 of FIG. 4, the product distributor may obtain a request from the customer for a custom physical item to be combined with the selected one or more stock items. For example, the request may be received via a UI to a product customization service provided by the product distributor via which customers may enhance, extend, customize, or combine stock items by specifying or selecting customizations including but not limited to custom items to be produced and combined with specified or selected stock items.

As indicated at 404 of FIG. 4, the product distributor may obtain a specification for the custom item. For example, in some embodiments, the request received from the customer may specify a digital representation (e.g., a 3D model, CGI model, or other digital representation) of the custom physical item. In some embodiments, the specification for the custom item may be received as input from the customer via the UI to the product customization service. In some embodiments, if a specification for the custom physical item is not provided by the customer, the product distributor may generate or obtain a digital representation (e.g., a 3D model) of the custom physical item indicated by the customer's request. For example, in some embodiments, a digital representation of a custom item may be generated at least in part from stock item information describing the stock item(s) for which the custom item is to be produced. For example the stock item information may include digital representations of at least some of the stock physical items carried by the product distributor that may be used in generating digital representations for custom items. In some embodiments, the product distributor may store custom item information which may include digital representations of or templates for custom items, and a digital representation of a custom item may be obtained from or generated at least in part according to the custom item information.

As indicated at 406 of FIG. 4, the product distributor may produce a physical instance of the custom item according to the specification. The product distributor may implement or have access to one or more on-demand production technologies or processes for fabricating new, custom physical items to be combined with one or more stock items. Technologies that may be used may include one or more of, but are not limited to, additive manufacturing technologies such as 3D printing technologies, parts fabrication technologies such as water jet cutter technologies, and so on. In at least some embodiments, the on-demand production technologies may include automated processes that produce or fabricate a new physical item or modify an existing physical item according to an input specification or digital representation such as a 3D model (e.g., a computer-aided design (CAD) model, computer-generated imagery (CGI) model, etc.) or other digital representation. However, the on-demand production technologies may also include semi-automated and/or manual processes.

As indicated at 408 of FIG. 4, the custom item may be combined with the one or more stock items to generate a customized product for the customer. As indicated at 310 of FIG. 4, the customized product may then be provided to the customer. For example, the one or more stock items may be picked from inventory of a materials handling facility and input to a product handling and distribution process. The custom item produced by the on demand production technology may also be input to the product handling and distribution process. In the product handling and distribution process, for example, stock items ordered by customers and picked from inventory may be sorted and merged with custom items requested by the customers and produced by the on demand production technology to generate customized products for the customers. The customized products may then be packaged and shipped to the respective customers. In some embodiments, custom packaging and/or labeling may be generated for the customized products.

In some embodiments, the customer may specify a custom item for stock item(s) as illustrated in FIG. 4 without obtaining the stock item(s) from the product distributor. In these cases, the custom item may be delivered to the customer without combining the custom item with stock item(s) to form a customized product.

Figure 5:
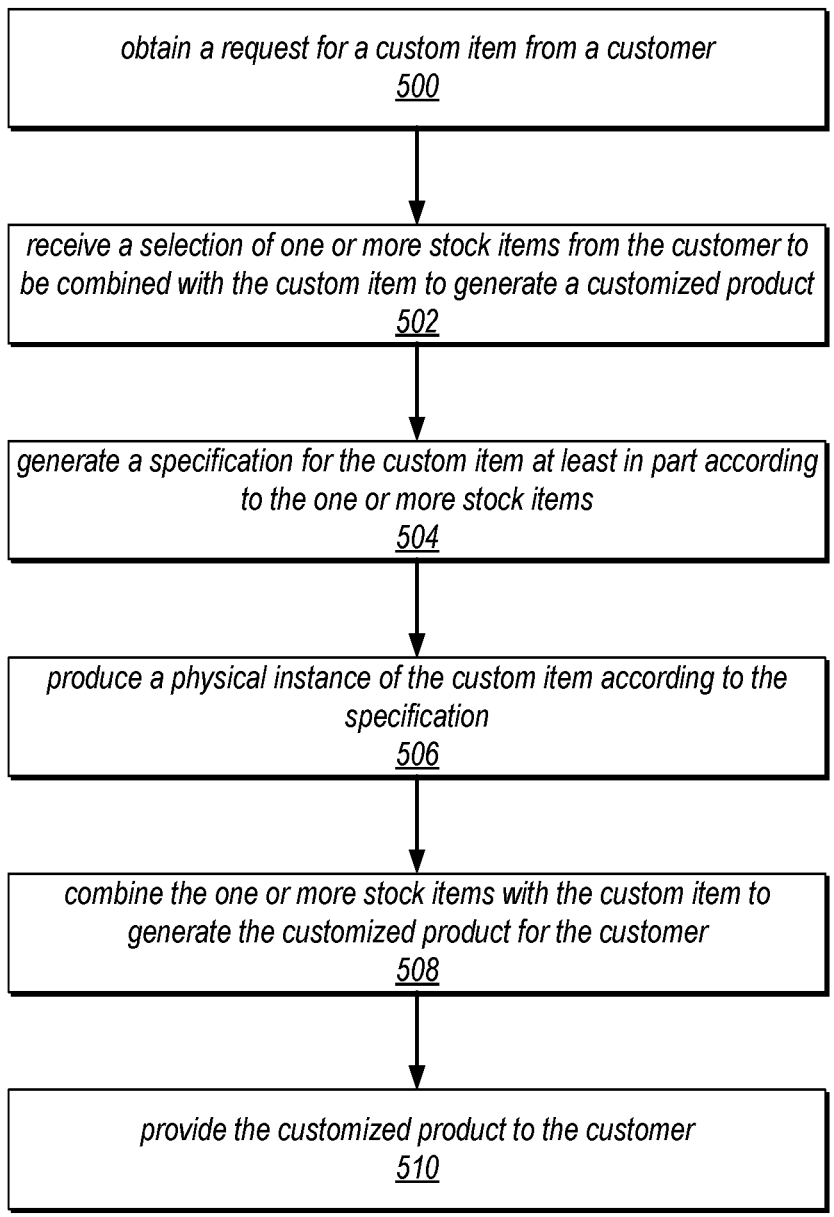
FIG. 5 is a flowchart of a method for producing a customer-requested customized product based on a specification generated from one or more stock items selected by the customer, according to at least some embodiments.

FIG. 5 is a flowchart of a method for producing a customer-requested customized product based on a specification generated from one or more stock items selected by the customer, according to at least some embodiments. The method of FIG. 4 may, for example, be performed at least in part by a product customization service in a product distributor environment as illustrated in FIGS. 2 and 3.

As indicated at 500 of FIG. 5, the product distributor may obtain a request for a custom physical item from a customer. For example, the request may be received via a UI to a product customization service provided by the product distributor via which customers may specify custom items to be produced and combined with selected stock items.

As indicated at 502 of FIG. 5, the product distributor may receive a selection of one or more stock items from the customer to be combined with the custom item to generate a customized product. For example, the selection may be received via a UI to the product customization service that allows customers to browse a product catalog of stock items offered by the product distributor to search for, view, and select stock items to be combined with the custom item. In some embodiments, the customer may, but does not necessarily, purchase the selected stock item(s) from the product distributor via the UI.

As indicated at 504 of FIG. 5, the product distributor may generate a specification for the custom item at least in part according to the one or more stock items. For example, the requested custom item may be a container, tool kit, camera bag, or the like for which the customer can specify which stock items (tools, camera lenses/accessories, etc.) are to be included in the container. This allows a customer to create a custom container. The product distributor may start with a template specification for the requested custom item and complete the specification according to stock item information for the selected stock items. For example the stock item information may include descriptions, dimensions, and/or digital representations of the selected stock physical items that may be used in generating or completing a specification or digital representation for the respective custom item.

As indicated at 506 of FIG. 5, the product distributor may produce a physical instance of the custom item according to the specification. For example, the product distributor may implement or have access to one or more on-demand production technologies or processes such as additive manufacturing technologies, parts fabrication technologies, and so on that may be used to produce the custom item according to the specification.

As indicated at 508 of FIG. 5, the one or more stock items may be combined with the custom item to generate the customized product for the customer. As indicated at 410 of FIG. 5, the customized product may be provided to the customer. For example, the one or more stock items may be picked from inventory and input to a product handling and distribution process that combines the stock items with the custom item to generate a customized product for the customer. The customized product may then be packaged and shipped to the respective customer. In some embodiments, custom packaging and/or labeling may be generated for the customized product.

In some embodiments, the customer may specify a custom item as illustrated in FIG. 5 without obtaining the stock item(s) from the product distributor. In these cases, the custom item may be delivered to the customer without combining the stock item(s) with the custom item to form a customized product.

Figure 6:
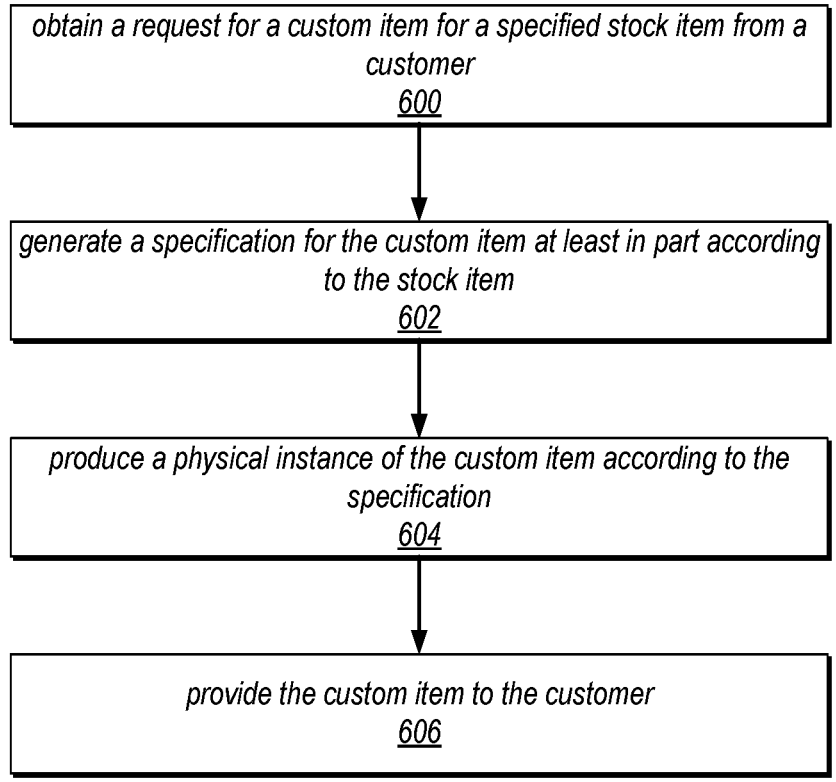
FIG. 6 is a flowchart of a method for producing a custom item for a stock item in response to a request for the custom item by a customer, according to at least some embodiments.

FIG. 6 is a flowchart of a method for producing a custom item for a stock item in response to a request for the custom item by a customer, according to at least some embodiments. The method of FIG. 6 may, for example, be performed at least in part by a product customization service in a product distributor environment as illustrated in FIGS. 2 and 3.

As indicated at 600 of FIG. 6, a product distributor may obtain a request for a custom item for a specified stock item from a customer. For example, the product distributor may provide a user interface (UI) to product distributor services via which customers may search for, view, and specify or select stock items offered by the product distributor. For at least some stock items, the UI may include one or more UI elements via which the user may select or specify a custom physical item for a specified stock item. In some embodiments, the customer may, but does not necessarily, purchase the selected stock item from the product distributor via the UI.

As indicated at 602 of FIG. 6, the product distributor may obtain or generate a specification for the custom item at least in part according to the selected stock item. For example, the product distributor may generate or obtain a digital representation (e.g., a 3D model) of the custom physical item indicated by the customer's request. In some embodiments, a digital representation of a custom item may be generated at least in part from stock item information describing the selected stock item for which the custom item is to be produced. For example the stock item information may include a digital representation of the stock physical item that may be used in generating a digital representation for the custom item. In some embodiments, the product distributor may store custom item information which may include digital representations of or templates for custom items, and a digital representation of the custom item may be obtained from or generated at least in part according to the custom item information.

As indicated at 604 of FIG. 6, produce a physical instance of the custom item according to the specification. For example, the product distributor may implement or have access to one or more on-demand production technologies or processes such as additive manufacturing technologies, parts fabrication technologies, and so on that may be used to produce the custom item according to the specification.

As indicated at 606 of FIG. 6, the product distributor may provide the custom item to the customer. In some embodiments, if the customer purchased the stock item from the product distributor when requesting the custom item, the stock item and custom item may be combined in a product handling and distribution process to generate a customized product for shipping to the customer. In some embodiments, custom packaging and/or labeling may be generated for the customized product. In some embodiments, if the customer did not purchase the stock item from the product distributor when requesting the custom item, then the custom item may be shipped to the customer.

Figure 7:
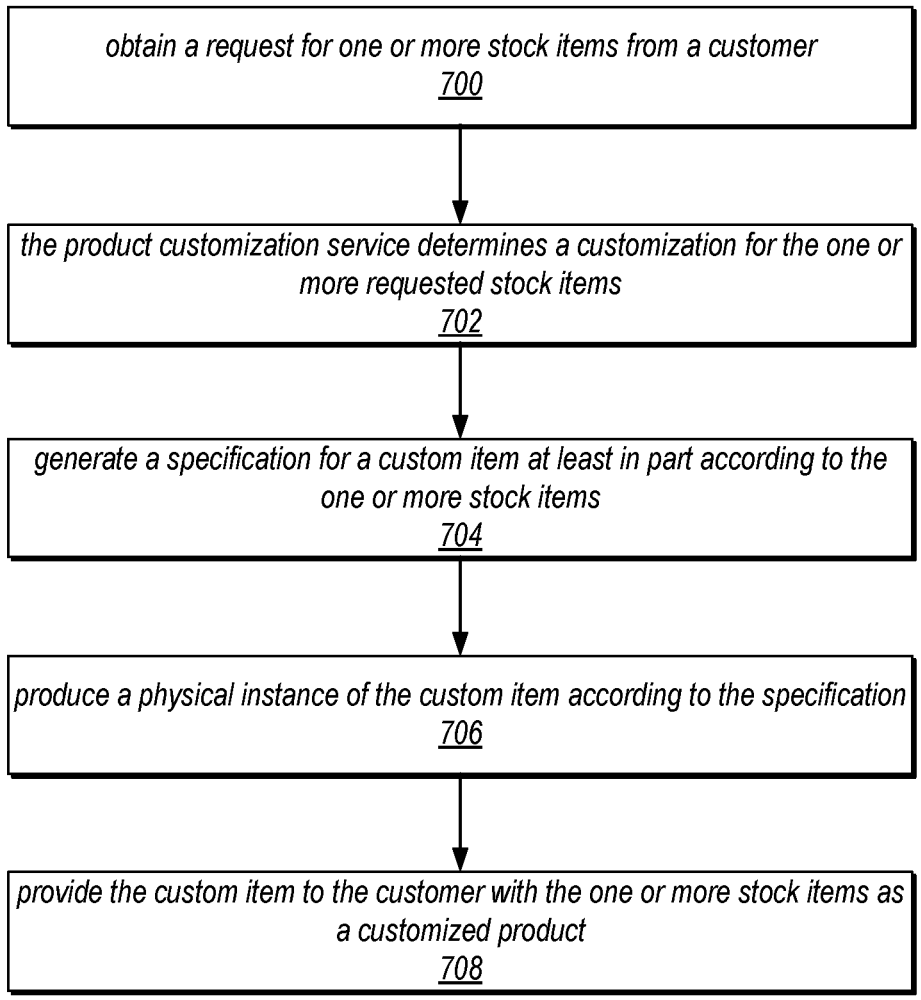
FIG. 7 is a flowchart of a method for generating a customized product by producing a custom item for one or more stock items requested by a customer, according to at least some embodiments.

FIG. 7 is a flowchart of a method for generating a customized product by producing a custom item for one or more stock items selected by a customer, according to at least some embodiments. The method of FIG. 7 may, for example, be performed at least in part by a product customization service in a product distributor environment as illustrated in FIGS. 2 and 3. In the method of FIG. 7, the customer does not necessarily specify or request a custom item for the selected stock item(s); instead, the product customization service dynamically determines a custom item for the selected stock item(s).

As indicated at 700 of FIG. 7, the product distributor may obtain a request for one or more stock items from a customer. For example, the request may be received as input via a user interface (UI) to product distributor services via which customers may browse a product catalog of stock items offered by the product distributor to search for, view, and specify or select stock items.

As indicated at 702 of FIG. 7, the product customization service may dynamically determine a customization for the one or more stock items, for example a custom attachment, container, or extension for the item(s). As noted above, the customer does not necessarily specify or request a customization for the requested items; instead, the product customization service dynamically determines a customization for the requested stock item(s). As an example, a customer may request an edged or bladed stock item such as a knife or tool, and the product customization service may determine that a custom sheath, cover, or container could be fabricated for the stock item, for example using 3D printing technology. Note that such sharp or edged items may require double packaging to be shipped due to safety concerns, and the production of a sheath or cover may help to satisfy safety concerns, as well as providing added value to the customer.

As indicated at 704 of FIG. 7, the product distributor may generate a specification for a custom item at least in part according to the one or more stock items. For example, the determined custom item may be a sheath, cover, or container for a tool, knife, or other stock item that the customer requested. The product distributor may start with a template specification for the custom item and complete the specification according to stock item information for the selected stock item. For example the stock item information for a stock item may include descriptions, dimensions, and/or digital representations of the selected stock physical item that may be used in generating or completing a specification or digital representation for the respective custom item.

As indicated at 706 of FIG. 7, produce a physical instance of the custom item according to the specification. For example, the product distributor may implement or have access to one or more on-demand production technologies or processes such as additive manufacturing technologies, parts fabrication technologies, and so on that may be used to produce the custom item according to the specification.

As indicated at 708 of FIG. 7, the custom item may be provided to the customer with the one or more stock items as a customized product. For example, the requested stock item may be picked from inventory and input to a product handling and distribution process that combines the stock item with the custom item to generate a customized product for the customer. The customized product may then be packaged and shipped to the respective customer. In some embodiments, custom packaging and/or labeling may be generated for the customized product.

Figure 8:
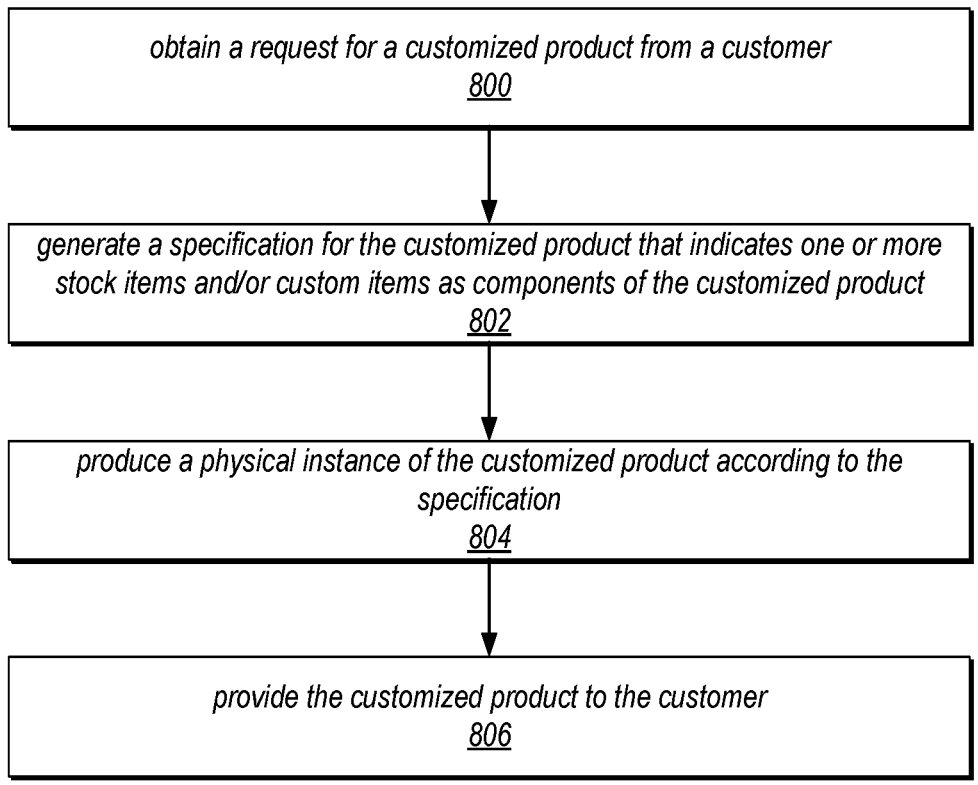
FIG. 8 is a flowchart of a method for generating a specification for a customized product from stock item information based on a customer request for a customized product, according to at least some embodiments.

FIG. 8 is a flowchart of a method for generating a specification for a customized product from stock item information based on a customer request for a customized product, according to at least some embodiments. The method of FIG. 8 may, for example, be performed at least in part by a product customization service in a product distributor environment as illustrated in FIGS. 2 and 3. In the method of FIG. 8, the customer does not necessarily select stock item(s) for customization or specify a customization for specified stock item(s); instead, the customer describes a desired customized product, and the product customization service generates a specification for the requested customized product to satisfy the request based at least in part on stock product information. In the method of FIG. 8, the customer provides a conception for a customized product, and from that the product customization service generates a specification for the customized product.

As indicated at 800 of FIG. 8, the product distributor may obtain a request for a customized product from a customer. For example, the request may be received via a UI to a product customization service via which customers may describe customized products that the customers want the product distributor to produce for them, if possible. However, a customer does not necessarily describe or select particular stock products for a requested customized product. Instead, the customer may just name and conceptually describe a desired customized product. The customer's description of a customized product may include one or more of, but is not limited to, a textual description, a digital representation (e.g., a 3D model), or visual representations of a desired customized product.

As indicated at 802 of FIG. 8, the product distributor may generate a specification for the customized product described by the customer. The specification may indicate one or more components of the customized product. The components may include stock products (as-is or with modifications), parts of stock products (as-is or with modifications), and/or custom fabricated items. To generate the specification, the product customization service may construct a digital model of and determine the components for the requested customized product as described by the customer at least in part from stock product information, for example information maintained in a product catalog of the product distributor. The specification may indicate one or more stock products, parts of stock products, and/or custom items as components of the customized product, and may also include models and/or instructions for fabricating, modifying, and/or assembling the components to form the customized product.

In some embodiments, the product customization service may search product information for stock products according to the descriptive information provided by the customer to identify one or more stock items and/or parts of stock items that may be used (as-is or with modifications) as components of the customized product. The product customization service may instead or also determine one or more custom items to be fabricated as components of the customized product from the stock item information and the descriptive information for the customized product, and may generate digital representations (e.g., 3D models) to be used in fabricating the custom items.

As indicated at 804 of FIG. 8, the product distributor may produce a physical instance of the customized product according to the specification. As indicated at 806 of FIG. 8, the product distributor may provide the customized product to the customer. For example, one or more stock items and/or parts of stock items may be picked from an inventory of the product distributor as components of the customized product. In addition, the product distributor may implement or have access to one or more on-demand production technologies or processes such as additive manufacturing technologies, parts fabrication technologies, and so on that may be used to produce one or more custom items as components of the customized products according to the specification. A product handling and distribution process may then collect and combine the component(s) to generate an instance of the customized product for the customer. The customized product may then be packaged and shipped to the respective customer. In some embodiments, custom packaging and/or labeling may be generated for the customized product.

In some embodiments, the product customization service may present a graphical and/or textual representation of the customized product based on the generated customization specification to the customer, for example via a user interface (UI) to the service. The customer may then accept or reject the proposed customized product via the UI. If rejected, the product customization service may generate and present another customization specification to the customer. In some embodiments, the customer may be allowed to modify a customization specification that is presented via the UI. In some embodiments, the product customization service may generate two or more alternative customization specifications for the customized product, and the customer may choose one or more of the customized products via the UI.

FIGS. 1 through 8 generally assume that the product distributor provides the stock items and performs fabrications and/or modifications according to a customization specification generated by the product customization service to generate the component(s) of a customized product, and then provides the customized product to the requesting customer. However, in some embodiments, the customer may already have one or more of the components (e.g., stock items) for a customized product, and the product distributor may provide the necessary component(s) to complete the customized product.

FIGS. 1 through 8 generally assume that the product distributor produces a physical instance of a customized product and provides the physical instance to the requesting customer. In some embodiments, for at least some customized products, the product distributor may assemble the customized product for delivery the customer. In some embodiments, for at least some customized products, instead of providing an assembled customized product to the requesting customer, the product distributor may generate the components of the customized product and a specification including instructions for assembling the components, and provide the components and instructions to the requesting customer. In some embodiments, in addition to stock items, stock item parts, and/or custom items, the product distributor may provide screws, fasteners, adhesives, paint, decals, tools, and in general any item that may be needed for completing a customized product.

FIGS. 1 through 8 generally assume that the product distributor performs fabrications and/or modifications according to a customization specification generated by the product customization service. However, in some embodiments, a customer may implement or have access to production technologies including but not limited to additive manufacturing technologies such as 3D printing technologies, parts fabrication technologies such as water jet cutter technologies, machining technologies, and so on that may be used by the customer to produce custom items and/or modifications to stock items based on the customization specifications generated by the product customization service of the product distributor. In these embodiments, the product customization service may generate a customization specification for a customized product as requested by the customer and, instead of producing the physical instance of the customized product, provide the specification to the customer so that the customer can produce (e.g., fabricate and/or modify) one or more of components of the customized product. In other words, the customer may request a customized product from the product distributor and, instead of producing the customized product for the customer, the product customization service of the product distributor generates a specification that essentially tells the customer how to produce the customized product.

Figure 9:
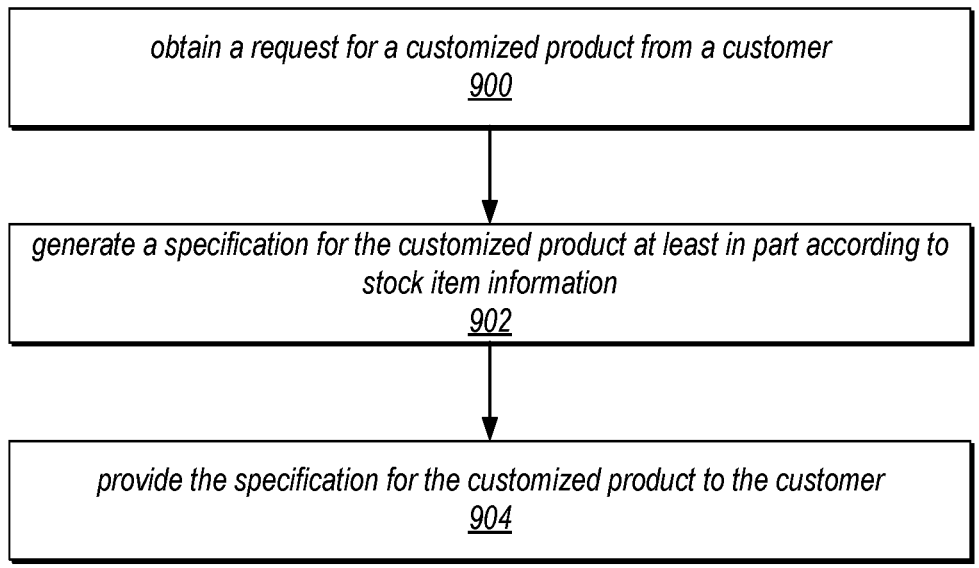
FIG. 9 is a flowchart of a method for generating and providing a specification for a customized product to a customer, according to at least some embodiments.

FIG. 9 is a flowchart of a method for generating and providing a specification for a customized product to a customer, according to at least some embodiments. The method of FIG. 9 may, for example, be performed at least in part by a product customization service in a product distributor environment as illustrated in FIGS. 2 and 3. In the method of FIG. 9, instead of providing a completed customized product to a customer, the product customization service may generate a customization specification for the customized product as requested by the customer and provide the specification to the customer so that the customer can produce (e.g., fabricate and/or modify) one or more of components of the customized product.

As indicated at 900 of FIG. 9, a request for a customized product may be received from a customer. As indicated at 902 of FIG. 9, the product customization service may generate a specification for the requested customized product. The specification may, for example, include a digital 3D model or other digital representation that may be used to fabricate or otherwise produce one or more components of the customized product. In some embodiments, the specification may be generated at least in part from information describing one or more stock items specified by the customer and/or determined by the product customization service based on the customer's request. As indicated at 904 of FIG. 9, the product customization service may then provide at least part the specification for the customized product to the requesting customer. The requesting customer may then produce component(s) of the customized product according to the provided specification. For example, the customer may possess or have access to 3D printing technology, and the specification may include a digital representation of a custom item that can be input to the 3D printer to fabricate an instance of the custom item.

Example User Interfaces

FIGS. 10A and 10B graphically illustrate example interfaces for on-demand customization of products, according to at least some embodiments. These interfaces are given by way of example, and are not intended to be limiting. The interfaces may, for example, be implemented by a UI 212 of a product distributor system 212 in a product distributor 200 environment as illustrated in FIG. 3.

FIG. 10A illustrates an example interface 1200A via which a customer may browse a product catalog of stock items 242 offered by the product distributor to search for, view, and specify or select stock items. Interface 1200A may include a stock item detail page 1220 and site navigation 1210. Site navigation 1210 may, for example, include one or more UI elements via which the customer may search the product distributor's site and navigate to other portions of the product distributor's site, for example to detail pages 1220 for other stock items.

Stock item detail page 1220 may include item information 1222 that may include one or more UI elements that display information about a currently selected stock item, such as images, descriptions, reviews, ratings, and related items. Stock item detail page 1220 may also include one or more user interface elements (e.g., an "add to order" button) that allow the customer to specify or order the currently selected stock item. Stock item detail page 1220 may also include customization options 1240 that may include one or more UI elements that allow the customer to view and request various customizations for the currently selected stock item. Non-limiting examples of customizations that may be displayed in options 1240 and requested by the customer are given below. Note that not all of these options may be provided for a product, and other options not shown may be provided for a product:

Replace part(s) 1241, via which a customer may request one or more parts of a stock item to be produced. The requested part(s) may be parts that the customer needs to replace due to loss, breakage, or wear, or existing parts that the customer wants to replace with a different part, for example with a smaller or larger part.

Add a custom item 1242, via which a customer may request a custom item to be combined with or added to the currently selected stock item.

Make a modification 1243, via which a customer may request one or more modifications for the currently selected stock item, for example a modification to make a part of the stock item smaller or larger.

Make a custom container 1244, via which a customer may request a custom container for the currently selected item, or a container for one or more specified items.

Combine stock items 1245, via which a customer may request that two or more stock items be combined using a custom item (e.g., a custom connector, container, etc.).

Request a custom product 1246, via which a customer may request a customized product that the customer wants the product distributor to generate a specification for.

In some embodiments, selecting one of the customization options 1240 may navigate the customer to another page or interface, such as interface 1200B as shown in FIG. 10B, via which the customer may further specify or define the requested customization to the stock product, and order a customized product as specified if desired. Interface 1200B may include site navigation 1210, stock item information and selection 1260, and customization specification 1280 sections. Site navigation 1210 may, for example, include one or more UI elements via which the customer may search the product distributor's site and navigate to other portions of the product distributor's site, for example to detail pages 1220 for other stock items. Stock item information and selection 1260 may display item information 1262 about one or more stock items related to a current customization. Stock item information and selection 1260 may also include stock item navigation/selection UI elements 1264 that may allow the customer to view, add, and remove stock items for the current customization, if applicable.

Customization specification 1280 may vary based on the type of customization. Non-limiting examples of customizations that may be specified in 1280 are given below. Note that not all of these customizations may be provided for a given product, and other options not shown may be provided for a given product:

Specify parts to replace 1281, via which a customer may specify one or more parts of a stock item to be produced.

Specify design or model custom item 1282, via which a customer may specify a custom item to be combined with or added to the currently selected stock item, for example by providing a 3D model or other digital representation.

Specify modification to stock item 1283, via which a customer may specify one or more modifications for the currently selected stock item, for example a modification to make a part of the stock item smaller or larger.

Specify stock items for container or combination 1284, via which a customer may select or specify stock items to be combined in a customized product, for example in a custom container such as a custom tool kit.

Describe a custom product 1285, via which a customer may describe the customer's conception of a requested custom product; the product customization service may then generate a specification based on the customer's description.

Example Network Environment

Figure 11:
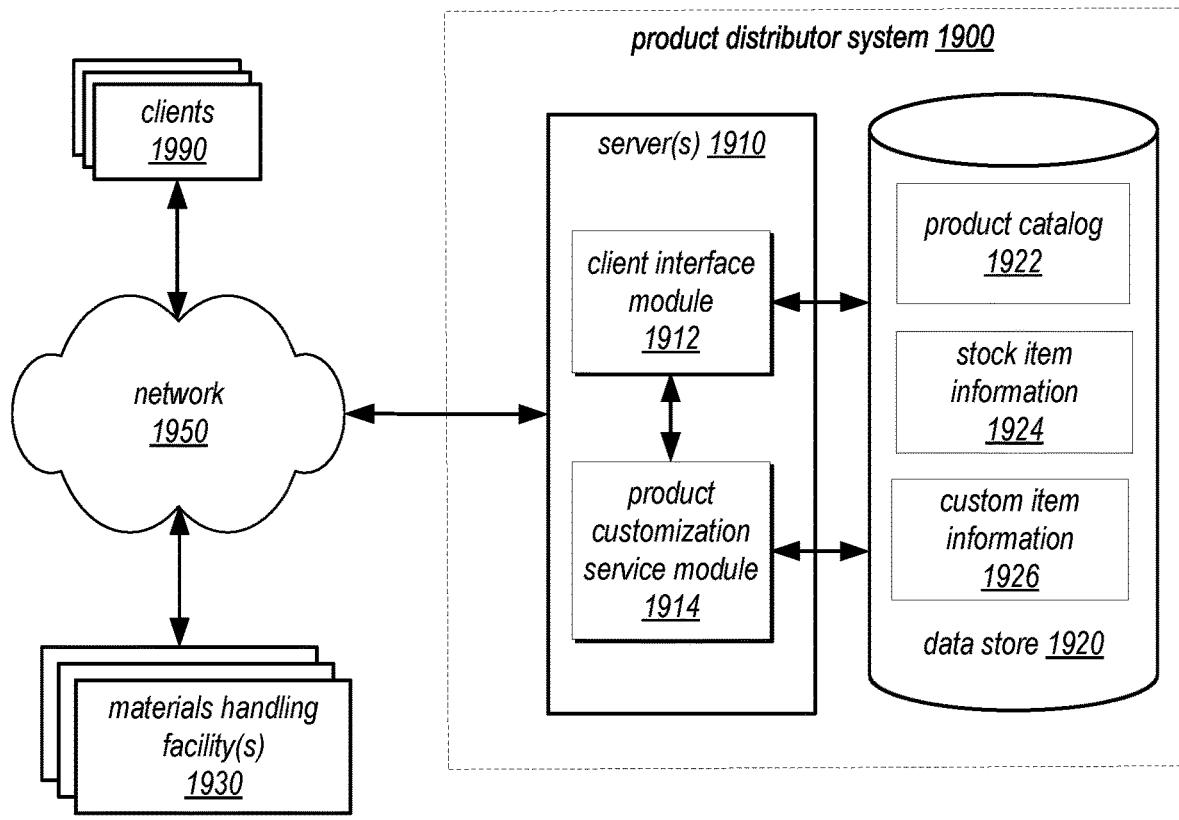
FIG. 11 illustrates an example network environment in which a product distributor system may implement product customization services, according to at least some embodiments.

FIG. 11 illustrates an example network environment in which a product distributor system may implement product customization services, methods, and interfaces as illustrated in FIGS. 1 through 10B, according to at least some embodiments. The environment may include one or more clients 1990 that may access a product distributor system 1900 across a network 1950. The network 1950 may be a local-area network ("LAN"), a wide-area network ("WAN"), the Internet, or any other networking topology known in the art that may connect client(s) 1990 to the product distributor system 1900. A client 1990 may, for example, represent an individual or entity (also referred to herein as a "customer") that desires to browse and/or purchase items, for example items offered for sale by a product distributor such as an online merchant. The items (also referred to herein as products) may include one or more of, but are not limited to, physical goods, digital media products, event tickets, media or service subscriptions, works such as books, movies, and albums, or in general any goods or services which can be purchased or otherwise obtained by a client 1990 of the product distributor system 1900. The product distributor system 1900 may include one or more servers 1910 that provide various online services to the clients 1990 over the network 1950. A client 1990 may use one or more client applications or interfaces to access and utilize the online services provided by servers 1910. A client application may, for example, be a web browser application. The network 1950 may also connect the product distributor system 1900 to one or more materials handling facilities 1930 of the product distributor. A materials handling facility 1930 may include, but is not limited to, stock product inventory, on-demand production technologies or facilities, and product handling and distribution processes, for example as illustrated in FIG. 3, that may be directed at least in part by product distributor system 1900 over the network 1950 or via other communications channels.

Servers 1910 may execute a number of modules in order to provide the online services to the clients 1990. The modules may execute on a single server 1910 or across multiple servers 1910 in the product distributor system 1900. In addition, each module may consist of a number of subcomponents executing on different application servers 1910 or other computing and/or storage devices in the product distributor system 1900. The modules may be implemented as software, hardware, or any combination thereof.

In at least some embodiments, a client interface module 1912 may retrieve information regarding a particular item offered for sale by the product distributor from product catalog 1922, generate item details containing at least some of the information regarding the particular item, and transmit the item details over the network 1950 to a client 1990. The item details may, for example, be presented or displayed by a client 1990 as an item page. Any of various methods and technologies may be utilized that allow the client interface module 1912 to send the item details to the clients 1990 for display on or as an item page. The product catalog 1922 may, for example, be stored in a data store 1920, such as a database or other storage mechanism available to servers 1910 in the product distributor system 1900. The data store 1920 may also include stock item information 1924 and/or custom item information 1926. The product catalog 1922 and/or stock item information 1924 may contain information regarding each stock item offered for sale by the product distributor, including but not limited to digital representations of the stock physical items that may be used in generating custom items and customized products as described herein. The custom item information 1926 may contain information regarding custom items that may be provided on demand by the product distributor, including but not limited to templates for or digital representations of the custom items that may be used in generating custom items and customized products as described herein.

In at least some embodiments, a product customization service module 1914 may execute on one or more servers 1910 to implement and perform one or more of the methods as described in reference to FIGS. 1 through 10B. For example, the product customization service module 1914 may execute on one or more servers 1910 to implement and perform producing a custom item as specified by a customer and combining the custom item with one or more stock items to generate a customized product, producing a customer-requested customized product based on a specification generated from one or more stock items selected by the customer, producing a custom item for a stock item in response to a request for the custom item by a customer, according to at least some embodiments, and/or generating a customized product by producing a custom item for one or more stock items requested by a customer, for example according to the methods as illustrated in FIGS. 1 through 10B. In at least some embodiments, product customization service module 1914 may provide one or more interfaces, for example user interfaces (UIs) or application programming interfaces (APIs), via which clients 1990 may interact with product distribution logic to perform the product customization methods as described herein.

Use Case Examples

This section describes several example use cases for embodiments of the product customization services, methods, and interfaces as illustrated in FIGS. 1 through 11. These use cases are given as examples, and are not intended to be limiting.

In some embodiments, the product customization services, methods, and interfaces as illustrated in FIGS. 1 through 11 may be used for on-demand completion of sets of stock products that are sold as individual pieces or sets. For example, a toy such as a doll or action figure may be sold as a set with a figure and one or more accessories. The product distributor may not have a particular set in stock when a customer wants it. However, the product distributor may have part of a set in stock, for example the doll or action figure itself, but not all of the accessories needed to complete the set. The on-demand production methods as described herein may be used to generate one or more missing accessories needed to complete the set. Information for producing the accessories (e.g., a digital representation or 3D model) may be pre-generated and stored by the product distributor, or may be otherwise obtained (e.g., from the product manufacturer or vendor). The stock item(s) and on-demand-produced accessories may be combined and provided to the customer as an on-demand customized product. Similarly, the on-demand production methods as described herein may be used to produce particular accessories for a stock item (e.g., an action figure) on demand to generate a custom set of the stock item with one or more accessories on demand for a customer. In some embodiments, custom packaging and/or labeling may be generated for a completed or custom set.

In some embodiments, the product customization services, methods, and interfaces as illustrated in FIGS. 1 through 11 may be used to generate missing parts for customers. For example, the product distributor may offer, and a customer may purchase, models, sets, kits, or the like that include multiple parts. Parts may be lost or broken, or may wear out. Rather than keeping an inventory of mass produced replacement parts, or forcing the customer to wait to receive an out-of-stock part, the on-demand production methods as described herein may be used to produce missing parts for customers on demand, when needed.

In some embodiments, the product customization services, methods, and interfaces as illustrated in FIGS. 1 through 11 may be used to generate replacement parts or consumable for stock items for customers. For example, the product distributor may offer, and a customer may purchase, products that include parts or accessories that may break, wear out, or be consumed over time, and thus that may periodically need to be replaced. Rather than keeping an inventory of mass produced replacement parts, or forcing the customer to wait to receive an out-of-stock replacement part, the on-demand production methods as described herein may be used to produce replacement parts for customers on demand, when needed.

In some embodiments, the product customization services, methods, and interfaces as illustrated in FIGS. 1 through 11 may be used to generate replacement parts for out-of-production products for customers. For example, the customer may own or obtain a product that is no longer produced, and for which replacement parts may be needed. Rather than keeping an inventory of replacement parts for out-of-production products, the on-demand production methods as described herein may be used to produce replacement parts for out-of-production products for customers on demand, when needed. For example, using embodiments of the product customization service, a customer may provide a specification for a particular replacement part for an old car for which replacement parts are not otherwise easily obtainable, and the product customization service may direct the on-demand production facilities of the product distributor to produce the part as specified by the customer. The specification may, for example, include one or more pictures or images of the part that needs to be replaced, dimensions for the part, materials and colors for the part, and in general any information that may be needed to fabricate a new part or modify an existing product or part to generate the replacement part.

In some embodiments, the product customization services, methods, and interfaces as illustrated in FIGS. 1 through 11 may be used to generate custom containers, packages, kits, shipping containers or cartons, camera bags, carrying cases, etc. (collectively referred to herein as containers), or inserts for containers, for customers. The containers and/or inserts may be custom manufactured on demand to hold or contain a specified set of stock items, or other items, and may be produced using technologies such as 3D printing so as to correctly fit and hold the specified items. Descriptive information for the items may be obtained from the customer and/or from stock item information maintained by the product distributor and used in fabricating the container and/or insert.

In some embodiments, the product customization services, methods, and interfaces as illustrated in FIGS. 1 through 11 may be used to generate custom sizes of stock items for customers. As a non-limiting example, a manufacturer or vendor may mass produce products in a limited range of fixed sizes, for example small, medium, and large (S, M, L). Using embodiments, custom instances of the products may be produced on demand in other sizes than the standard sizes based on customers' specifications or measurements.

In some embodiments, the product customization services, methods, and interfaces as illustrated in FIGS. 1 through 11 may be used to generate custom items that are produced on demand according to personal "body scan" digital information received from the customers when specifying or requesting a customized product. As a non-limiting example, a manufacturer or vendor may mass produce products with handles in a limited range of fixed sizes, for example small, medium, and large (S, M, L) handles on sports rackets. Using embodiments, a custom instance of a handle may be produced on demand that is sized and contoured according to digital scan information for a particular customer's hands. Other examples of products that may be produced on demand according to customers' digital body scan information include, but are not limited to, shoes and shoe inserts, helmets and helmet inserts, and gloves.

In some embodiments, the product customization services, methods, and interfaces as illustrated in FIGS. 1 through 11 may be used to generate custom combinations of items for customers. As a non-limiting example, vendor(s) may mass produce products that come in pairs (e.g., shoes) in a fixed range of sizes, with both items in the pair being the same size. The product distributor may stock the products as provided by the vendor(s). Using embodiments, custom instances of the products may be produced on demand that include items of different sizes (e.g., a left shoe of one size, and a right shoe of another size) based on customers' specifications. The custom products may, for example, be produced by picking the items for the combination from stock products in inventory and/or by modifying or fabricating items in an on-demand production facility according to the customers' specifications.

Illustrative System

Figure 12:
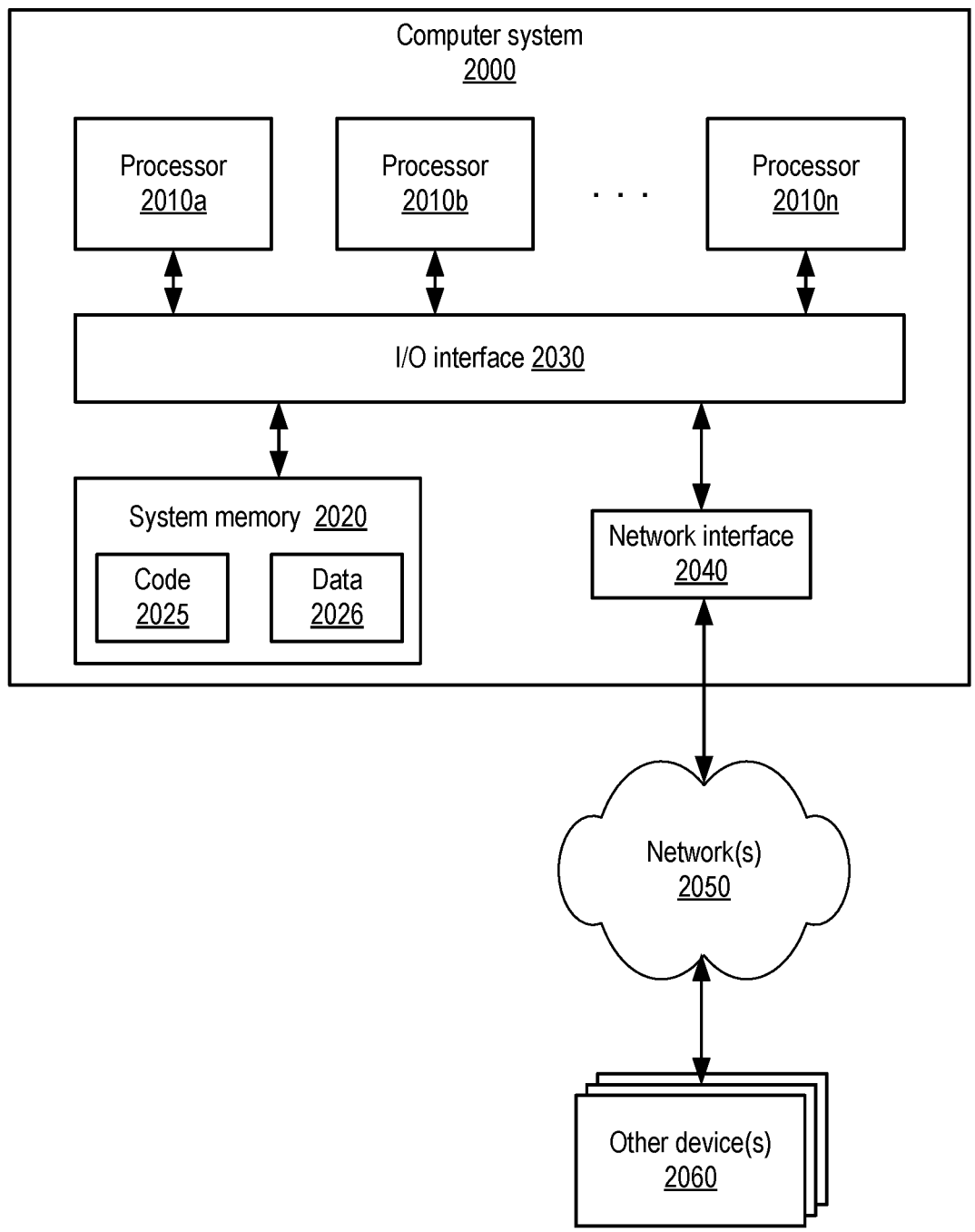
FIG. 12 is a block diagram illustrating an example computer system that may be used in some embodiments.

In at least some embodiments, a computing device that implements a portion or all of the methods and apparatus as described herein may include a general-purpose computer system that includes or is configured to access one or more computer-accessible media, such as computer system 2000 illustrated in FIG. 12. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data as described herein in reference to FIGS. 1 through 11, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 10, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 10 for implementing embodiments of methods and apparatus as described herein. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
receiving input from a client describing a custom product to be produced based on a stock physical item;
determining a customization specification for the custom product based on the received input and descriptive information for the stock physical item, wherein the customization specification comprises a digital representation of the custom product; and
providing the customization specification for the custom product to an automated process implemented by a production facility, the automated process configured to:
determine, based on the customization specification including the digital representation, whether to modify the stock physical item or to produce an instance of a custom physical item according to the customization specification; and
modify the stock physical item or produce the instance of the custom physical item according to the customization specification to form the custom product.

2. The method of claim 1, further comprising:
obtaining the descriptive information for the stock physical item from stock item information maintained for the stock physical item.

3. The method of claim 1, further comprising:
modifying the customization specification based at least in part on a stock specification for the stock physical item.

4. The method of claim 1, wherein the automated process is further configured to:
receive the customization specification; based on a determination to produce the instance of the custom physical item, produce the custom physical item; and
physically combine the custom physical item with the stock physical item to form a customized product according to the provided customization specification.

5. The method of claim 1, wherein the customization specification includes a digital representation of the custom physical item, and wherein the custom physical item is produced according to the digital representation.

6. The method of claim 1, wherein the custom physical item comprises an accessory for the stock physical item, wherein the accessory is configured to be attached to or combined with the stock physical item.

7. The method of claim 1, wherein the custom physical item comprises a modified or replacement part for the stock physical item.

8. A system, comprising:
one or more processors; and
a memory storing instructions that, when executed on or across the one or more processors, cause the one or more processors to implement a product customization service configured to:
receive input from a client describing a custom product to be produced based on a stock physical item;
determine a customization specification for the custom product based on the received input and descriptive information for the stock physical item, wherein the customization specification comprises a digital representation of the custom product; and provide the customization specification for the custom product to an automated process implemented by a production facility, the automated process configured to:
  determine, based on the customization specification including the digital representation, whether to modify the stock physical item or to produce an instance of a custom physical item according to the customization specification; and
  direct modification of the stock physical item or production of the instance of the custom physical item according to the customization specification to form the custom product.

9. The system of claim 8, wherein the production facility is configured to:
  receive, from the product customization service, the customization specification; and
  produce the custom physical item.

10. The system of claim 9, wherein the production facility is further configured to: physically combine the custom physical item with the stock physical item to form the custom product according to the customization specification.

11. The system of claim 9, wherein the production facility is further configured to:
  send, to the client, instructions for combining the custom item with the stock physical item to form the custom product.

12. The system of claim 8, wherein the product customization service is configured to:
  obtain the descriptive information for the stock physical item from stock item information maintained for the stock physical item.

13. The system of claim 12, wherein the descriptive information comprises a digital representation of the stock physical item.

14. The system of claim 8, wherein the customization specification comprises a digital representation of the custom physical item.

15. The system of claim 8, wherein the automated process comprises one or more of a modification process or a fabrication process configured to fabricate the custom physical item.

16. One or more non-transitory computer-readable storage media storing program instructions that, when executed on or across one or more processors, cause the one or more processors to:
  receive input from a client describing a custom product to be produced based on a stock physical item;
  determine a customization specification for the custom product based on the received input and descriptive information for the stock physical item, wherein the customization specification comprises a digital representation of the custom product; and
  provide the customization specification for the custom product to an automated process implemented by a production facility, the automated process configured to:
    determine, based on the customization specification including the digital representation, whether to modify the stock physical item or to produce an instance of a custom physical item according to the customization specification; and
    direct modification of the stock physical item or production of the instance of the custom physical item according to the customization specification to form the custom product.

17. The one or more non-transitory computer-readable storage media of claim 16, further comprising instructions that, when executed on or across the one or more processors, further cause the one or more processors to:
  obtain the descriptive information for the stock physical item from stock item information maintained for the stock physical item.

18. The one or more non-transitory computer-readable storage media of claim 17, further comprising instructions that, when executed on or across the one or more processors, further cause the one or more processors to:
  modify the customization specification based at least in part on a stock specification of the stock physical item.

19. The one or more non-transitory computer-readable storage media of claim 17, wherein the descriptive information comprises a digital representation of the stock physical item.

20. The one or more non-transitory computer-readable storage media of claim 17, further comprising instructions that, when executed on or across the one or more processors, further cause the one or more processors to:
  receive, from the client, a digital representation of the custom product.

* * * * *